(12) United States Patent
Wilson (10) Patent No.: US 10,041,178 B2
(45) Date of Patent: Aug. 7, 2018

(54) END PRESSURE PLATE FOR ELECTROLYSERS

(71) Applicant: Next Hydrogen Corporation, Mississauga (CA)

(72) Inventor: Chris Wilson, Port Perry (CA)

(73) Assignee: Next Hydrogen Corporation (CA)

(*) Notice: Subject to any disclaimer, the term of this patent is extended or adjusted under 35 U.S.C. 154(b) by 231 days.

(21) Appl. No.: 15/081,393

(22) Filed: Mar. 25, 2016

(65) Prior Publication Data

US 2016/0230294 A1 Aug. 11, 2016

Related U.S. Application Data

(63) Continuation of application No. 14/202,815, filed on Mar. 10, 2014, now Pat. No. 9,404,190.

(60) Provisional application No. 61/777,476, filed on Mar. 12, 2013.

(51) Int. Cl.
*C25B 9/20* (2006.01)
*C25B 9/18* (2006.01)
*C25B 9/06* (2006.01)
*C25B 1/08* (2006.01)
*C25B 1/04* (2006.01)

(52) U.S. Cl.
CPC ............... *C25B 9/206* (2013.01); *C25B 1/04* (2013.01); *C25B 1/08* (2013.01); *C25B 9/066* (2013.01); *C25B 9/18* (2013.01); *Y02E 60/366* (2013.01)

(58) Field of Classification Search
None
See application file for complete search history.

(56) References Cited

U.S. PATENT DOCUMENTS

| | | | |
|---|---|---|---|
| 2,075,688 A | 3/1937 | Zdansky | |
| 4,758,322 A | 7/1988 | Sioli | |
| 5,139,635 A | 8/1992 | Signorini | |
| 5,783,051 A | 7/1998 | Hirai et al. | |
| 6,124,051 A * | 9/2000 | Johnson | H01M 4/8626 |
| | | | 429/434 |
| 6,428,921 B1 | 8/2002 | Grot | |
| 6,720,101 B1 | 4/2004 | Dong et al. | |
| 7,291,413 B2 | 11/2007 | Allen et al. | |
| 7,776,488 B2 | 8/2010 | Evertz et al. | |
| 7,879,207 B2 | 2/2011 | Dalton et al. | |
| 8,076,017 B2 | 12/2011 | Matsumoto et al. | |
| 8,308,917 B2 | 11/2012 | Hinatsu et al. | |
| 2003/0027031 A1 | 2/2003 | Baldauf et al. | |
| 2005/0048347 A1 | 3/2005 | Takashita et al. | |
| 2005/0115825 A1 | 6/2005 | Frank et al. | |
| 2005/0186462 A1 | 8/2005 | Belanger et al. | |
| 2007/0172715 A1 | 7/2007 | Molter et al. | |
| 2009/0286134 A1 | 11/2009 | Kim et al. | |
| 2011/0024303 A1 | 2/2011 | Cerny et al. | |
| 2011/0042228 A1 | 2/2011 | Hinatsu et al. | |
| 2013/0001070 A1 | 1/2013 | Stemp et al. | |
| 2015/0118591 A1* | 4/2015 | Hood | H01M 8/248 |
| | | | 429/434 |

* cited by examiner

*Primary Examiner* — Harry D Wilkins, III
(74) *Attorney, Agent, or Firm* — Harness, Dickey & Pierce, P.L.C.

(57) ABSTRACT

An end pressure plate is provided for an electrochemical cell stack or an electrolyzer module. The end pressure plates comprise a load transfer plate for maintaining even pressure over the faces of the structural plates, and a backing plate for supporting load transferred from the load transfer plate.

8 Claims, 11 Drawing Sheets

END PRESSURE PLATE FOR ELECTROLYSERS

CROSS-REFERENCE TO RELATED APPLICATIONS

This is a continuation of U.S. application Ser. No. 14/202,815 filed Mar. 10, 2014, which claims the benefit of U.S. Provisional Application No. 61/777,476 filed Mar. 12, 2013. The entire disclosure of the above application is incorporated herein by reference.

FIELD OF THE INVENTION

The present invention relates to the design of end pressure plates for electrolyser stacks and electrolyser modules operating at elevated pressures.

BACKGROUND OF THE INVENTION

Electrolysers use electricity to transform reactant chemicals to desired product chemicals through electrochemical reactions, i.e., reactions that occur at electrodes that are in contact with an electrolyte. Water electrolysers, which produce hydrogen and oxygen from water and electricity, are the most common type of electrolyser used for production of gaseous hydrogen as the main product. The most common types of commercial water electrolysers are alkaline water electrolysers (AWE) and polymer electrolyte membrane (PEM) water electrolysers.

As used herein, the terms "cell", "electrolysis cell" and equivalent variations thereof refer to a structure comprising a cathode half cell and an anode half cell.

Also as used herein, the terms "electrolyser cell stack", "electrolyser stack", "stack", or equivalent variations thereof refer to structures used for practical (commercial) electrolysers such as water electrolysers comprising multiple cells, in which the cells typically are electrically connected in series (although designs using cells connected in parallel and/or series also are known), with bipolar plates physically separating but providing electrical communication between adjacent cells. The term "electrolyser module" refers to the combination of an electrolyser stack and gas-liquid separation spaces in the same structure, which typically is of the filter press type. Further, the term "electrolyser module" as used herein may refer to an alkaline electrolyser module or a PEM electrolyser module. We previously disclosed designs for an alkaline water electrolyser module in U.S. Pat. No. 8,308,917, and for a PEM water electrolyser module in US 2011/0042228, both of which are incorporated herein by reference.

As used herein, the term "structural plate" refers to a body having a sidewall extending between opposite end faces with a half cell chamber opening, and in the case of an electrolyser module, additionally at least one degassing chamber opening extending through the structural plate between the opposite end faces. An electrolyser stack or an electrolyser module typically is constructed using a series of structural plates to define alternately cathode and anode half cell chambers, fluid flow passages, and in the case of an electrolyser module, at least one degassing chamber, and respective gas-liquid flow passages and respective degassed liquid flow passages extending between the one or more degassing chambers and the corresponding half cell chambers. The structural plates are arranged in face to face juxtaposition between opposite end pressure plates, optionally with at least one intermediate pressure plate interspersed between the structural plates along a length of the electrolyser stack or electrolyser module, to form a filter press type structure with structural plates stacked in the interior of the assembly between end pressure plates. The structural plates also hold functional components, which may include, for example, cathodes, anodes, separator membranes, current collectors, and bipolar plates, in their appropriate spatial positions and arrangement. The end pressure plates provide compression of the filter press type structure and enable pressure retention.

Generally contemplated operating pressures of electrolyser modules and electrolyser stacks lie between atmospheric pressure and 30 barg, and more typically up to 10 barg, depending on the application requirements. Older electrolyser stack designs utilize steel structural plates, which enable operation at elevated pressures, e.g., 30 barg, but present other challenges, such as very high weight, the need for electrical insulation, and potential for corrosion. Modern, "advanced" electrolyser stack and electrolyser module designs utilize structural plates made of polymeric materials, which are electrically insulating, corrosion resistant, and their light weight enables pre-assembled packaged formats, even for high output capacity units. However, typically, end pressure plates have remained essentially massive metal end flanges, even in "advanced" designs, the design approach being to control deflection, with very low stresses in the plates. This may be tolerable for smaller capacity units, but for larger capacity units, the end pressure plates become overly massive, extremely heavy, and very costly, particularly for operation at elevated pressure, since the end pressure plates must remain flat and without deflection for functionality. Welded assemblies can be added to stiffen end pressure plates and mitigate deflection, but the welded assemblies add further to weight, size, manufacturability, and especially, cost. Conventional massive end pressure plates are described in, for example, U.S. Pat. No. 8,308,917 (feature 11), US 2011/0042228 (feature 11), U.S. Pat. No. 5,139,635 (feature 12, "end flanges), U.S. Pat. No. 4,758,322 (features 404, 405, "covers"), and U.S. Pat. No. 2,075,688 (features 28, 29, "heavy end plates").

US 2011/0024303 discloses a design utilizing a single end pressure plate, using a moving platen that is pressed against a stack of electrolyser plates, relative to a surrounding press structure that provides a fixed support so that the single moving platen can apply compressive force transversely to the stacked plates via a compression member, to compress the stacked plates between opposite faces of the surrounding press structure. Drawbacks to this design are (i) a need to design the surrounding structure for specific numbers or lengths of stacked plates; (ii) uncertainty in the amount of compressive force to apply via the compression member, e.g., for any given operating pressure and temperature, and a need to check the amount of compressive force applied under thermal and/or pressure cycling. The ability of the design to mitigate deflection of the relatively thin plates seems questionable, especially for electrolysers with a large face area operating at higher pressures. A higher degree of inherent design robustness in terms of scalability and a passive, self-regulating approach would be beneficial for practical operation.

Thus, what is needed is a simple, lightweight, cost effective, self-regulating and scalable design approach for end pressure plates for electrolyser modules and electrolyser stacks, especially large-scale electrolyser modules and electrolyser stacks that operate at higher pressures.

SUMMARY

An end pressure plate for an electrolyser stack or an electrolyser module comprising a load transfer plate for maintaining even pressure over the faces of a plurality of structural plates, and a backing plate for supporting load transferred from the load transfer plate.

An electrolyser module comprising a plurality of structural plates each having a sidewall extending between opposite end faces with a half cell chamber opening and at least two degassing chamber openings extending through the structural plate between the opposite end faces. The structural plates are arranged in face to face juxtaposition between opposite end pressure plates. Each half cell chamber opening at least partially houses electrolytic half cell components comprising at least an electrode, a bipolar plate in electrical communication with the electrode, and a membrane communicating with the electrode for providing ionic conduction. The structural plates and half cell components define an array of series connected electrolytic cells surmounted by at least one degassing chamber. The structural plates define, at least when in face to face juxtaposition, passages for fluid flow inside the electrolyser module. The end pressure plates comprise a load transfer plate for maintaining even pressure over the faces of the structural plates, and a backing plate for supporting load transferred from the load transfer plate.

An electrolyser stack comprising a plurality of structural plates each having a sidewall extending between opposite end faces with a half cell chamber opening, at least two header flow passage openings and at least one footer flow passage opening extending through the structural plates between said opposite end faces. The structural plates are arranged in face to face juxtaposition between opposite end pressure plates. Each half cell chamber opening at least partially houses electrolytic half cell components, comprising at least an electrode, a bipolar plate in electrical communication with the electrode, and a membrane communicating with the electrode for providing ionic conduction. The structural plates and half cell components define an array of series connected electrolytic cells. The structural plates define, at least when in face-to-face juxtaposition, passages for fluid flow inside the electrochemical cell stack. The end pressure plates comprise a load transfer plate for maintaining even pressure over the faces of the plurality of structural plates, and a backing plate for supporting load transferred from the load transfer plate.

DESCRIPTION OF DRAWINGS

Preferred embodiments of the present invention are described below with reference to the accompanying illustrations in which.

DESCRIPTION OF PREFERRED EMBODIMENTS

Figure 1:
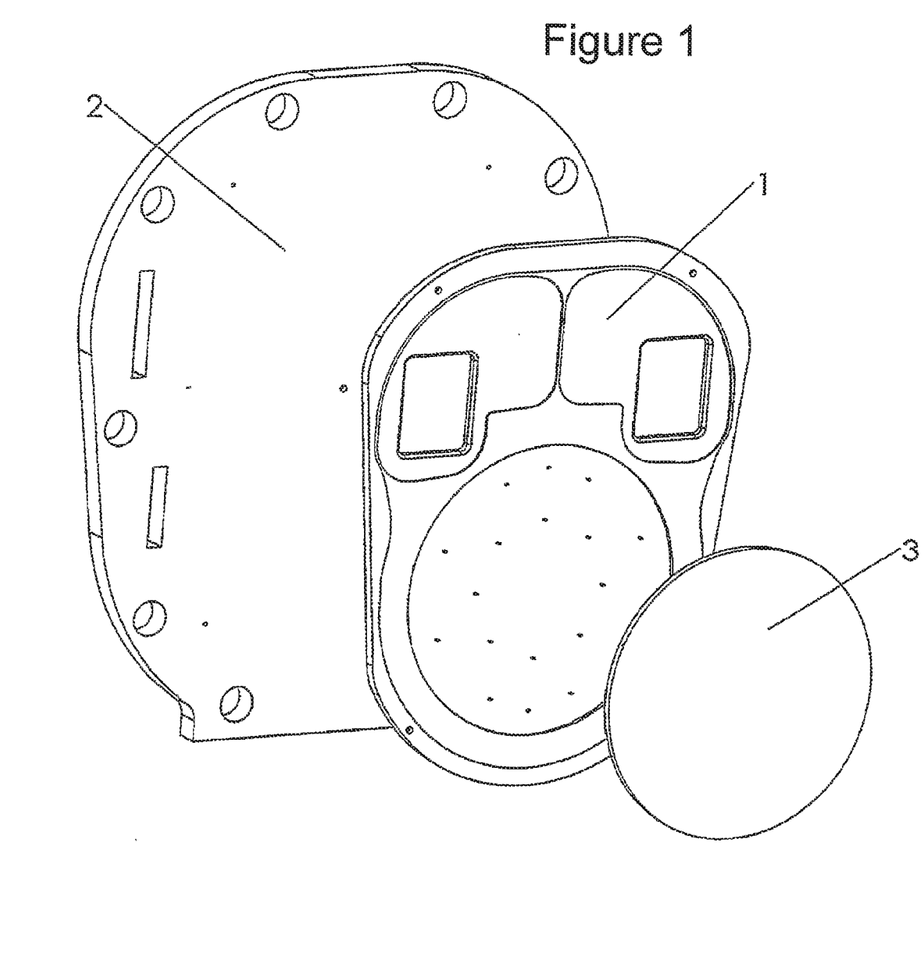
FIG. 1 is an exploded view of an end pressure plate showing the arrangement and relative positions of the backing plate, the load transfer plate, and the conductor plate.
Figure 2:
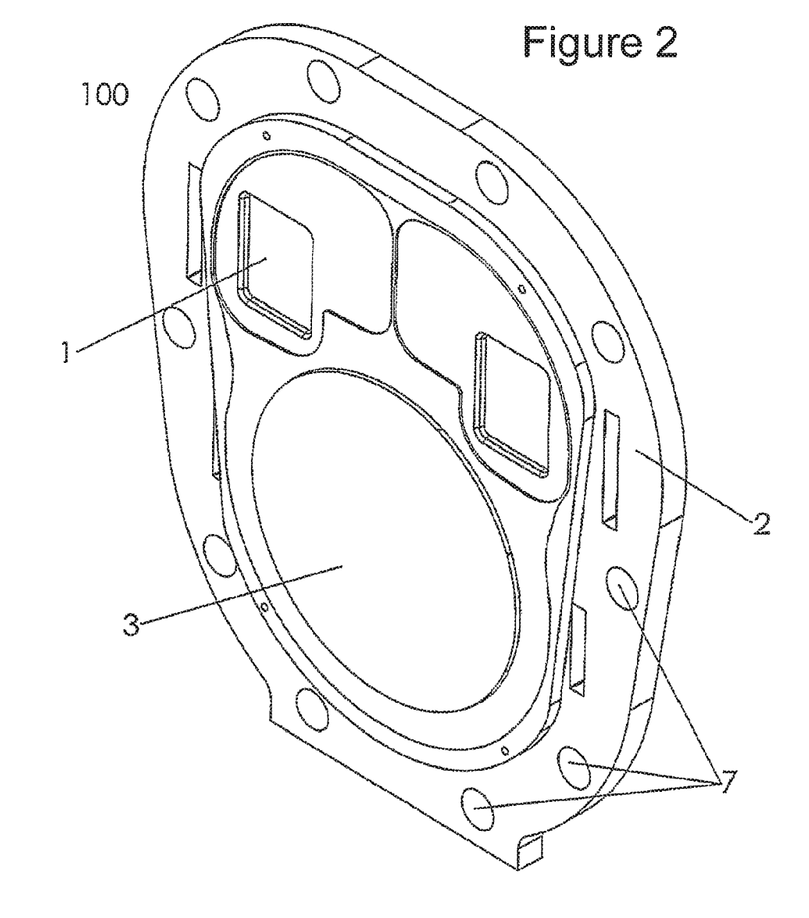
FIG. 2 is a front elevation showing the interior-facing side of an assembled end pressure plate.

In the present invention, as shown in FIGS. 1 and 2, an end pressure plate 100 for an electrolyser stack or an electrolyser module comprises a load transfer plate 1 for maintaining even pressure over the faces of stacked structural plates, and a backing plate 2 for supporting load transferred from the load transfer plate. An optional conductor plate 3 provides electrical communication with the electrochemical cell portions of the electrolyser stack or electrolyser module. The end pressure plates are used at either end of an electrolyser stack or electrolyser module to provide compression and pressure retention, in conjunction with a tie rod compression system. A critical aspect of this functionality is flatness of the end pressure plate when the interior of the electrolyser stack or electrolyser module is pressurized. Previous approaches used very thick and heavy end pressure plates and/or welded assemblies to prevent deflection at the centers of the end pressure plates. The present invention controls deflection, but maintains relatively light weight and better optimizes material use.

Figure 3A:
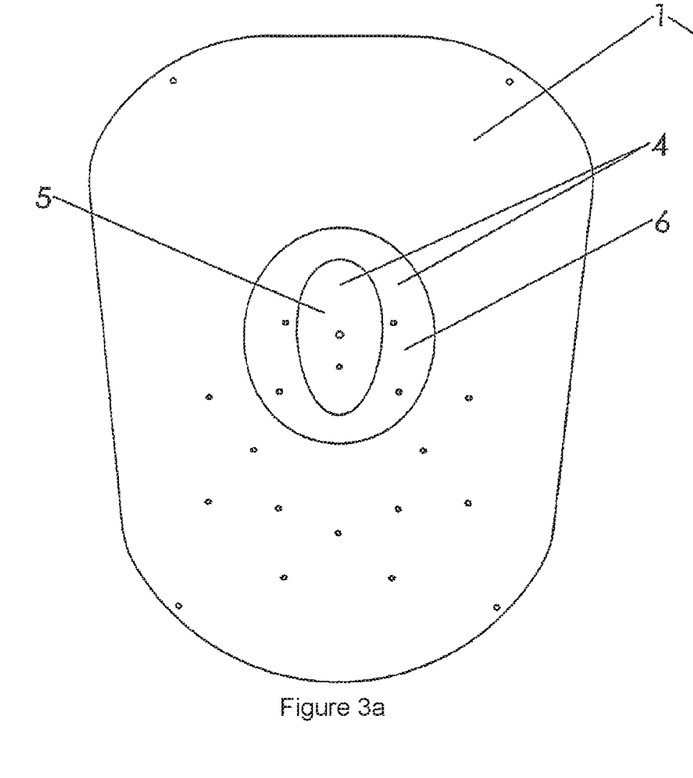
FIGS. 3a and 3b are front elevations respectively showing the exterior-facing and interior-facing faces of an embodiment of a load transfer plate.
Figure 3B:
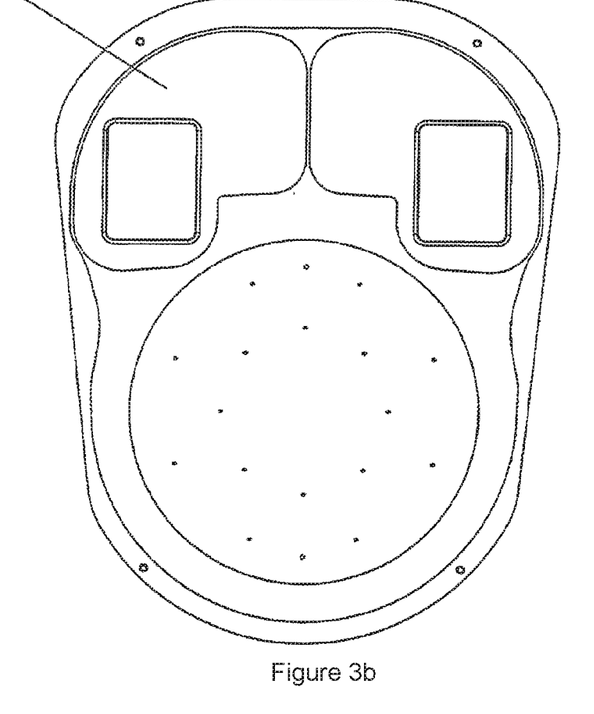
Figure 4A:
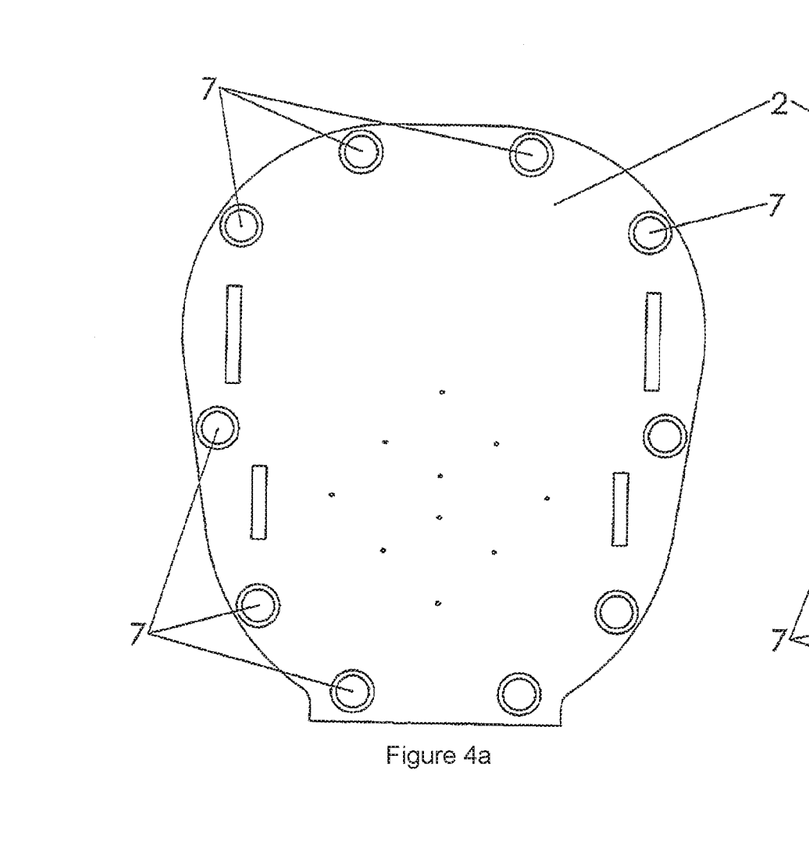
FIGS. 4a and 4b are front elevations respectively showing the exterior-facing and interior-facing faces of an embodiment of a backing plate.
Figure 4B:
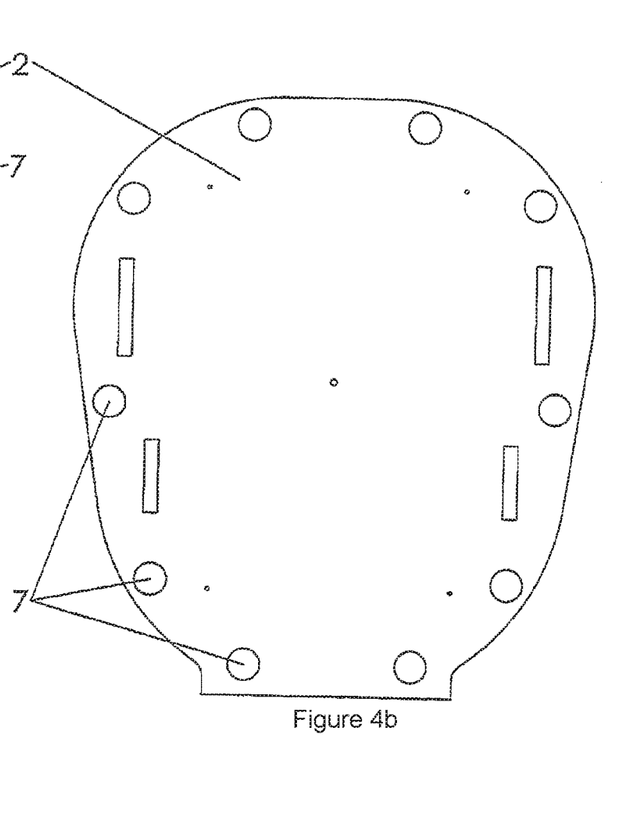

A preferred embodiment is shown in FIGS. 3a and b and 4a and b. FIGS. 3a and b respectively show the interior-facing and exterior-facing faces of a load transfer plate 1. The exterior-facing face of the load transfer plate 1 (FIG. 3a) includes a shallow convex domed surface 4 which faces and is in direct contact with an opposing interior-facing face of the backing plate 2. The opposing interior-facing face of the load transfer plate (FIG. 3b) is flat and is in contact with the opposing face of the adjacent of the plurality of stacked structural plates in the electrolyser stack or the electrolyser module. FIGS. 4a and b show the exterior-facing and interior-facing faces respectively of the backing plate 2. As shown in FIG. 3a, the domed surface 4 may be truncated with a flat portion 5 for stable and predictable assembly, with a fillet 6 between the flat portion 5 of the domed surface and the surrounding flat part of the same face of the load transfer plate 1. As the internal pressure of the electrolyser cell stack or electrolyser module increases, in each of the two end pressure plates 100, the load transfer plate 1 is loaded and transfers load to the backing plate via its domed face. As the load increases, the backing plate 2 bends and the contact area between the plates spreads until, at maximum load, the juxtaposed face of the backing plate conforms to the opposing shallow domed face of the load transfer plate. Thus, the backing plates bend under the pressure load, but the load transfer plates remain flat and maintain continuous support over the juxtaposed faces of the end members of the plurality of stacked structural plates of the electrolyser stack or electrolyser module. The electrolyser stack or electrolyser module assembly is compressed and held together by a tie rod compression system, with tie rods passing through the through holes 7 in the backing plates 2 (FIG. 4).

Figure 5A:
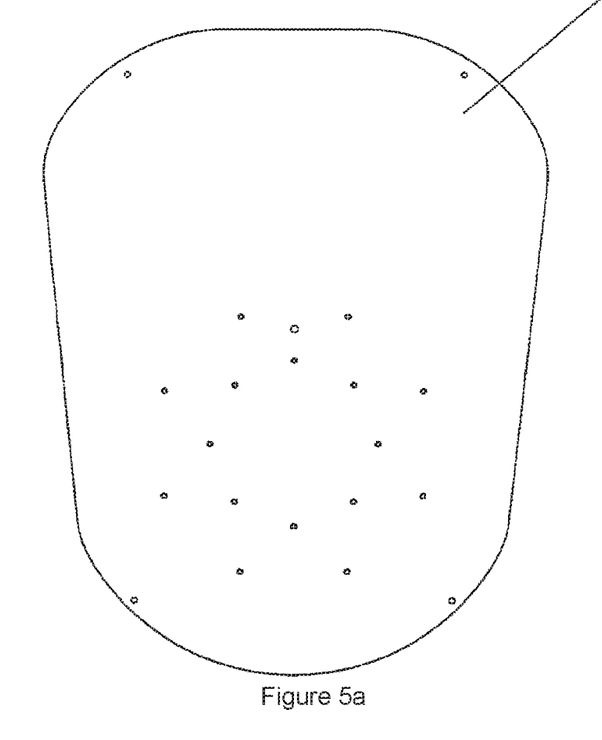
FIGS. 5a and 5b are front elevations respectively showing the exterior-facing and interior-facing faces of another embodiment of a load transfer plate.
Figure 5B:
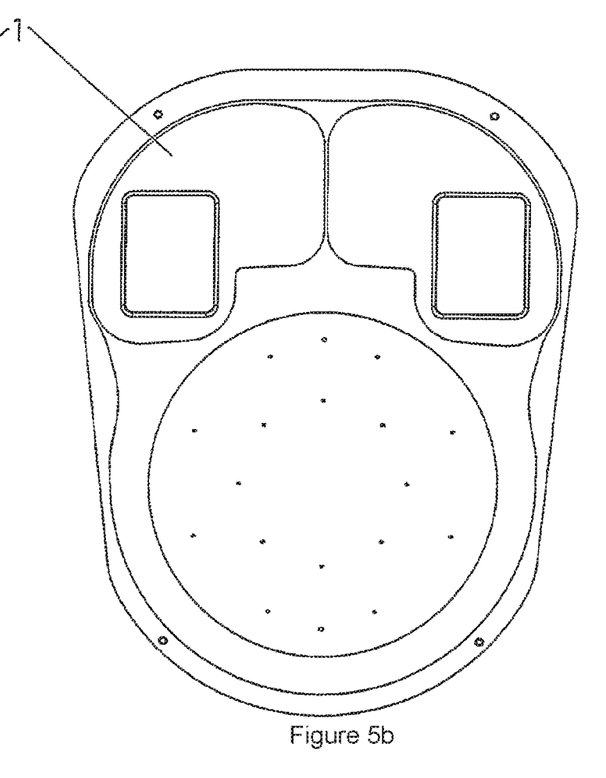
Figure 6A:
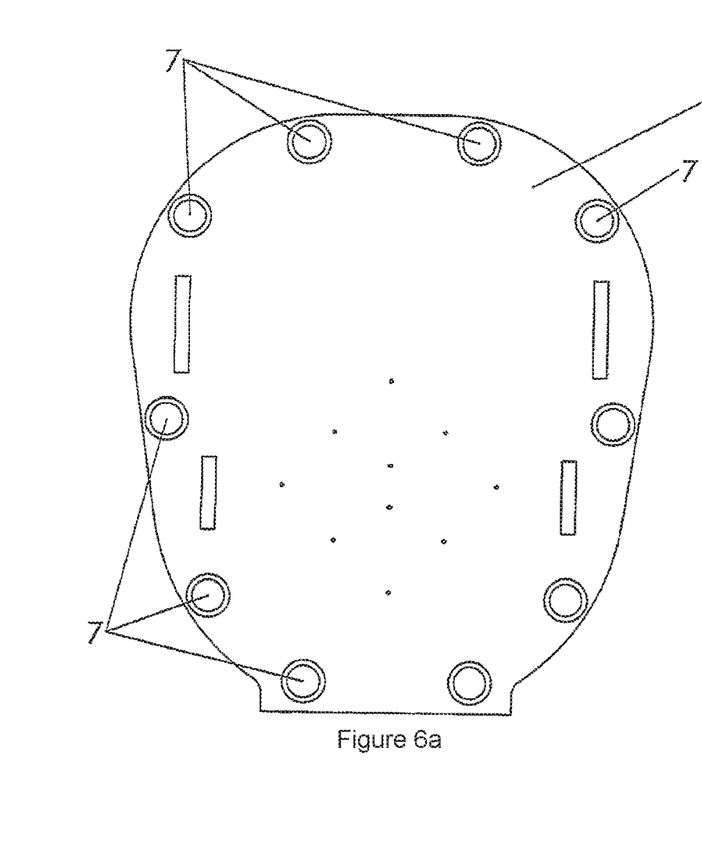
FIGS. 6a and 6b are front elevations respectively showing the exterior-facing and interior-facing faces of another embodiment of a backing plate.
Figure 6B:
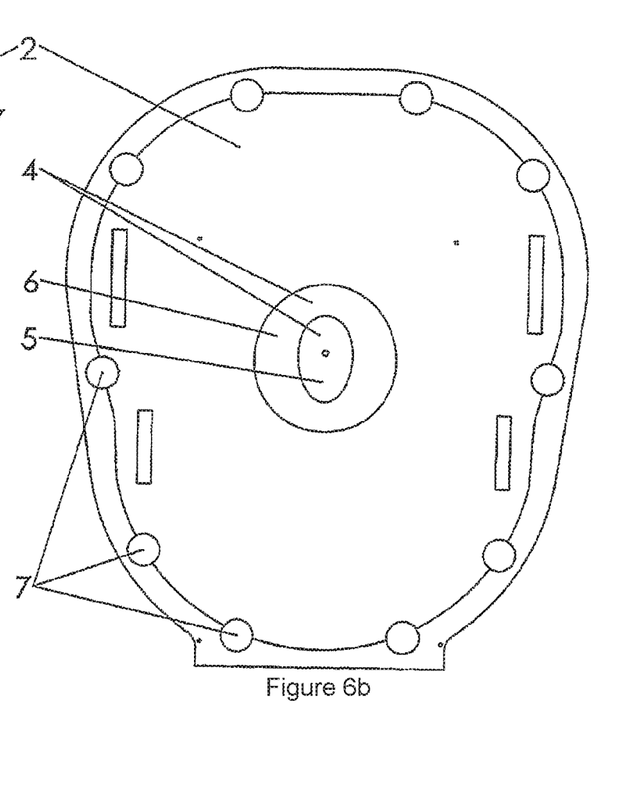

Another preferred embodiment is shown in FIGS. 5a and b and 6a and b. In this embodiment, both sides of the load transfer plate 1 are flat (FIGS. 5a and 5b). The interior-facing face of the backing plate 2 (FIG. 6b) includes a shallow convex domed surface 4 which faces and is in direct contact with the opposing exterior-facing face of the load transfer plate (FIG. 5a). The exterior-facing face of the backing plate 2 (FIG. 6a) is flat. As shown in FIG. 6b, the domed surface 4 may be truncated with a flat portion 5 for stable and predictable assembly, with a fillet 6 between the flat portion 5 of the domed surface and the surrounding flat part of the same face of the backing plate 2. As the internal pressure of the electrolyser cell stack or electrolyser module increases, in each of the two end pressure plates 100, the load transfer plate 1 is loaded and transfers load to the backing plate 2 via the domed face 4 of the backing plate 2. As the load increases, the backing plate 2 bends and the contact area between the plates spreads until, at maximum load, the juxtaposed face of the backing plate 2 flattens and conforms to the opposing face of the load transfer plate 1. Thus, the backing plates 2 bend under the pressure load, but the load transfer plates 1 remain flat and maintain continuous support over the juxtaposed faces of the end members of the plurality of stacked structural plates of the electrolyser stack or electrolyser module. The electrolyser stack or electrolyser module assembly is compressed and held together by a tie rod compression system, with tie rods passing through the through holes 7 in the backing plates 2 (FIG. 6).

Other embodiments of the end pressure plate 100 also can be considered; for example, the opposing faces of the load transfer plate 1 and the backing plate 2 can both include a domed surface. The load transfer plate 1 could comprise the embodiment shown in FIGS. 3a and b, and the backing plate could comprise the embodiment shown in FIGS. 6a and b. Each of the domed surfaces 4 may be truncated with a flat portion 5 for stable and predictable assembly, with a fillet 6 between the domed surface 5 and the surrounding surface of the load transfer plate 1 or the backing plate 2. The flat portions 5 of the respective domed surfaces 4 of the interior-facing face of the backing plate 2 and of the exterior-facing face of the load-transfer plate 1 would be in face-to-face opposition.

End pressure plates 100 can be made of metal, plated metal or coated metal, e.g., one or more of steel, stainless steel, nickel-plated steel, nickel-plated stainless steel, nickel and nickel alloy. The term "metal" is to be understood to include metals and metal alloys. The load transfer plate and the backing plate are most preferably made of steel, and the optional conductor plate is most preferably made of nickel-plated steel.

Figure 7:
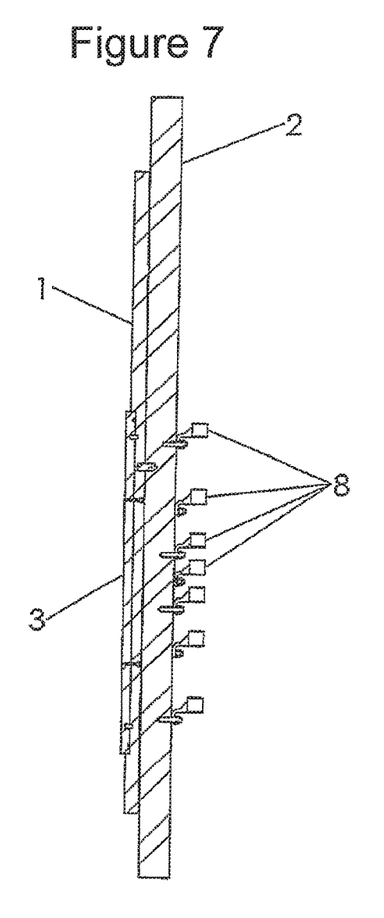
FIG. 7 is a side section of an end pressure plate showing the arrangement and relative positions of the backing plate, the load transfer plate, and the conducting plate, as well as lugs for attaching electrical cables.

The end pressure plates 100 also conduct electricity to the cell portions of the electrolyser stack or electrolyser module. As shown in FIG. 7, external electrical connections are made via lugs 8 in the backing plates 2. The backing plates 2 are in electrical communication with the load transfer plates 1. Portions of the backing plates 2 can in turn be in direct electrical communication with the cell portions of the electrochemical stack or electrolyser module. Alternatively, as shown in FIGS. 1, 2 and 7, the backing plates 2 can be in electrical communication with suitably coated or plated conductor plates 3 via the juxtaposed faces, with the opposite faces of the conductor plates 3 in electrical communication with the cell portions of the electrolyser stack or electrolyser module.

Figure 8:
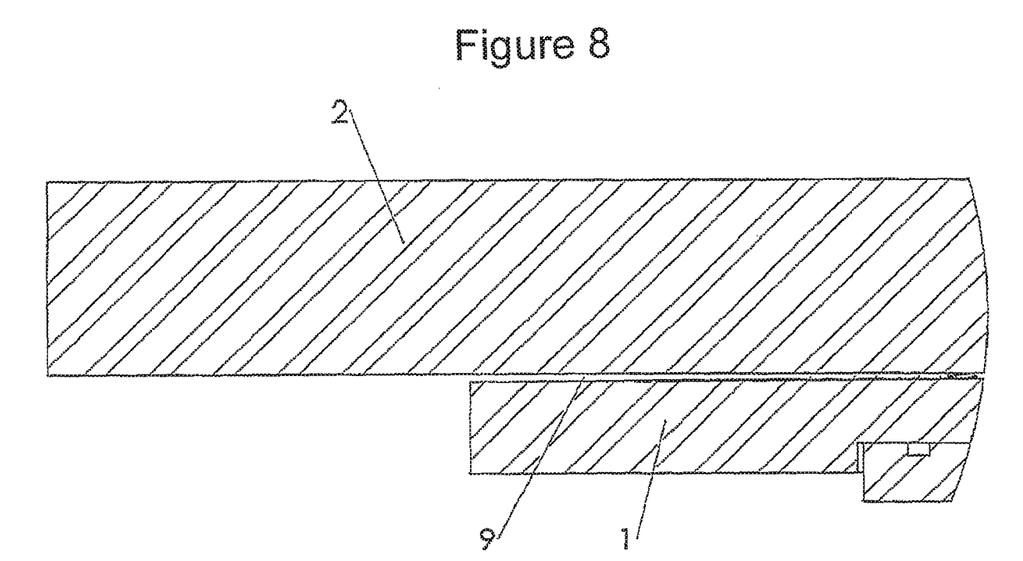
FIG. 8 is a side section view of the outer portion of the end pressure plate, showing a pre-compression gap between the backing plate and the load transfer plate around the perimeter of the load transfer plate.

The domed face of the load transfer plate may create a gap 9 between the load transfer plate 1 and the backing plate 2 around the periphery of the load transfer plate 1, as shown in FIG. 8. Some of the gap is taken up by pre-compression of the electrolyser stack or electrolyser module, but typically some gap is left after pre-compression, to accommodate thermal expansion at elevated operating temperatures. In some cases, e.g., with "short" electrolyser modules with relatively few cells and less overall thermal expansion to accommodate, the gap may not be necessary.

Figure 9:
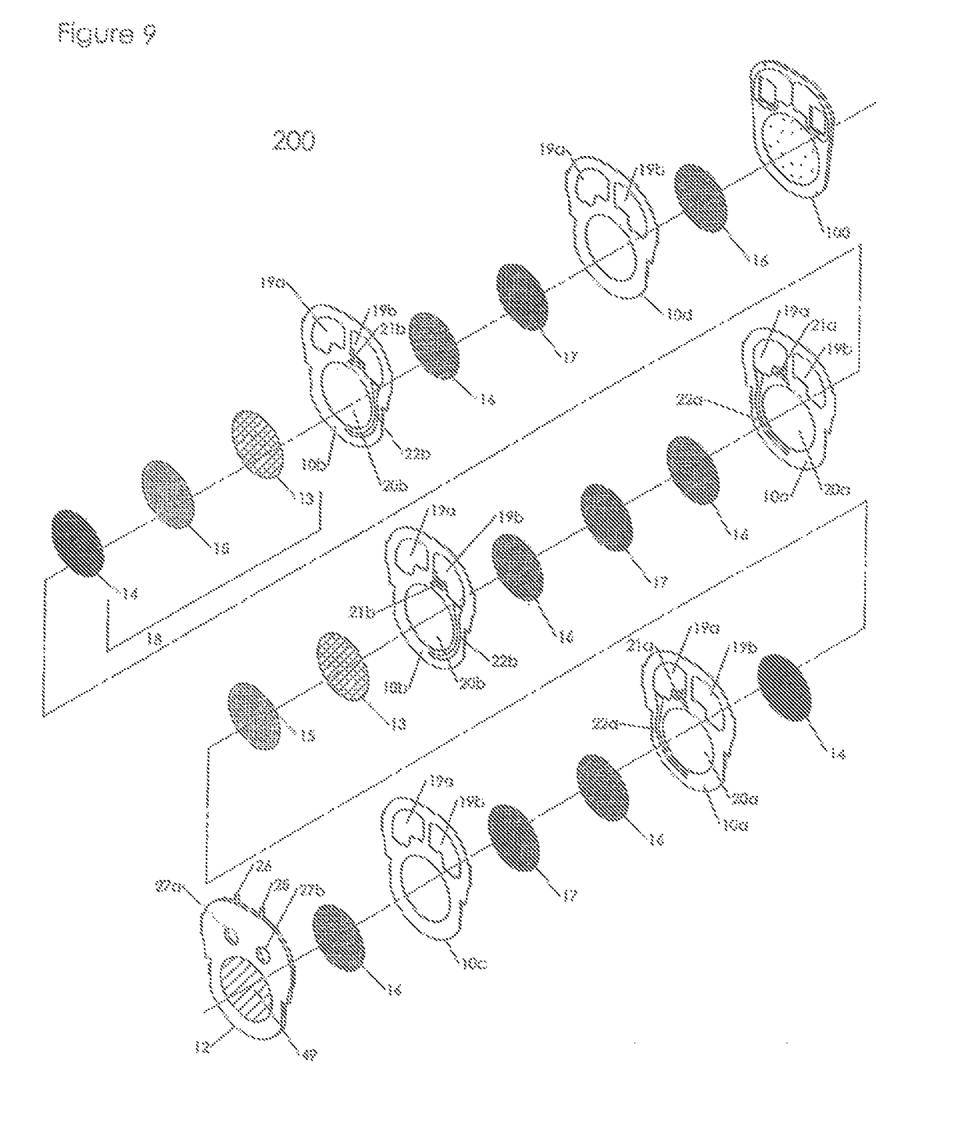
FIG. 9 is an exploded view of about half of an alkaline electrolyser module in accordance with the present invention.

An alkaline electrolyser module in accordance with an aspect of the present invention is shown generally at 200 in FIG. 9. FIG. 9 shows about half of an alkaline electrolyser module with 4 cells for illustrative purposes only; the other half of the electrolyser module would be a mirror image (on either side of feature 12, which in this case represents the midpoint of the electrolyser module). In practice, typically greater numbers of cells and stacked parts would be incorporated. Alkaline electrolyser module 200 includes structural plates 10, end pressure plates 100, anodes 13, cathodes 14, membranes 15, current carriers 16, bipolar plates 17, and optionally, one or more intermediate pressure plates 12 interspersed between structural plates along the length of the electrolyser module. There are two main types of structural plates 10: cathode structural plates 10a and anode structural plates 10b. Additionally, special structural plates 10c and 10d can optionally be used on either side of the one or more optional intermediate pressure plates 12 and also optionally at either of the end pressure plates 100, respectively, e.g., to help to accommodate cooling conduits (e.g., cooling tubes or cooling coils).

Alkaline electrolyser module 200 thus comprises a plurality of electrolysis cells 18 and associated degassing chambers 19. The electrolysis cells 18 preferably are located at the bottom part of the electrolyser module 200, and the associated degassing chambers 19 preferably are located at the top part of the electrolyser module 200, surmounting the electrolysis cells 18. The electrolysis cells comprise cathode and anode half cell chambers 20a and 20b defined by two adjacent structural plates, as well as a cathode 14, an anode 13, a membrane 15, and current collectors 16. More than one current collector 16 can be used per half cell chamber 20a and/or 20b. Bipolar plates 17 physically separate and provide electrical communication between adjacent cells. The membrane 15 is in communication with each of the electrodes for providing ionic conduction. The optional intermediate pressure plates 12 optionally include suitably coated or plated electrically conducting areas or separate part 49, to facilitate electrical current flow through the portions of the intermediate pressure plates corresponding to the active cell area. The intermediate pressure plates 12 can be made of metal, plated metal, or coated metal, for example, but not limited to, one or more of steel, stainless steel, plated or coated steel, plated or coated stainless steel, nickel and nickel alloy. The term "metal" is to be understood to include metals and metal alloys.

As shown in FIG. 9, each cathode half cell chamber 20a is in direct fluid communication with the hydrogen degassing chamber 19a via a gas-liquid flow passage 21a, and a degassed liquid flow passage 22a. Similarly, each anode half cell chamber 20b is in direct fluid communication with the oxygen degassing chamber 19b via a gas-liquid flow passage 21b, and a degassed liquid flow passage 22b. Separated hydrogen gas exits through hydrogen gas discharge passage 25, which extends radially through to the hydrogen degassing chamber; separated oxygen gas exits through separated oxygen gas discharge passage 26, which extends radially through to the oxygen degassing chamber. Gas discharge passages 25 and 26 typically are contained in the optional intermediate pressure plates 12, or in one or both of the end pressure plates 100. In the former case, through holes 27a and 27b allow for gas communication between gas discharge passages 25 and 26 and degassing chambers 19a and 19b, respectively. Feed water is introduced to one or both of the hydrogen and oxygen degassing chambers 19a and 19b through feed water passages (not shown), which also typically are located in the optional intermediate pressure plates 12 or in one or both of the end pressure plates 100. Electrical current is supplied to the cell portion of electrolyser module 200 by, for example, a DC power supply, most commonly via positive and negative electrical connections to end pressure plates 100, and optionally with a non-current carrying electrical ground connection to optional intermediate pressure plate 12 at the midpoint of electrolyser module 200.

Figure 10:
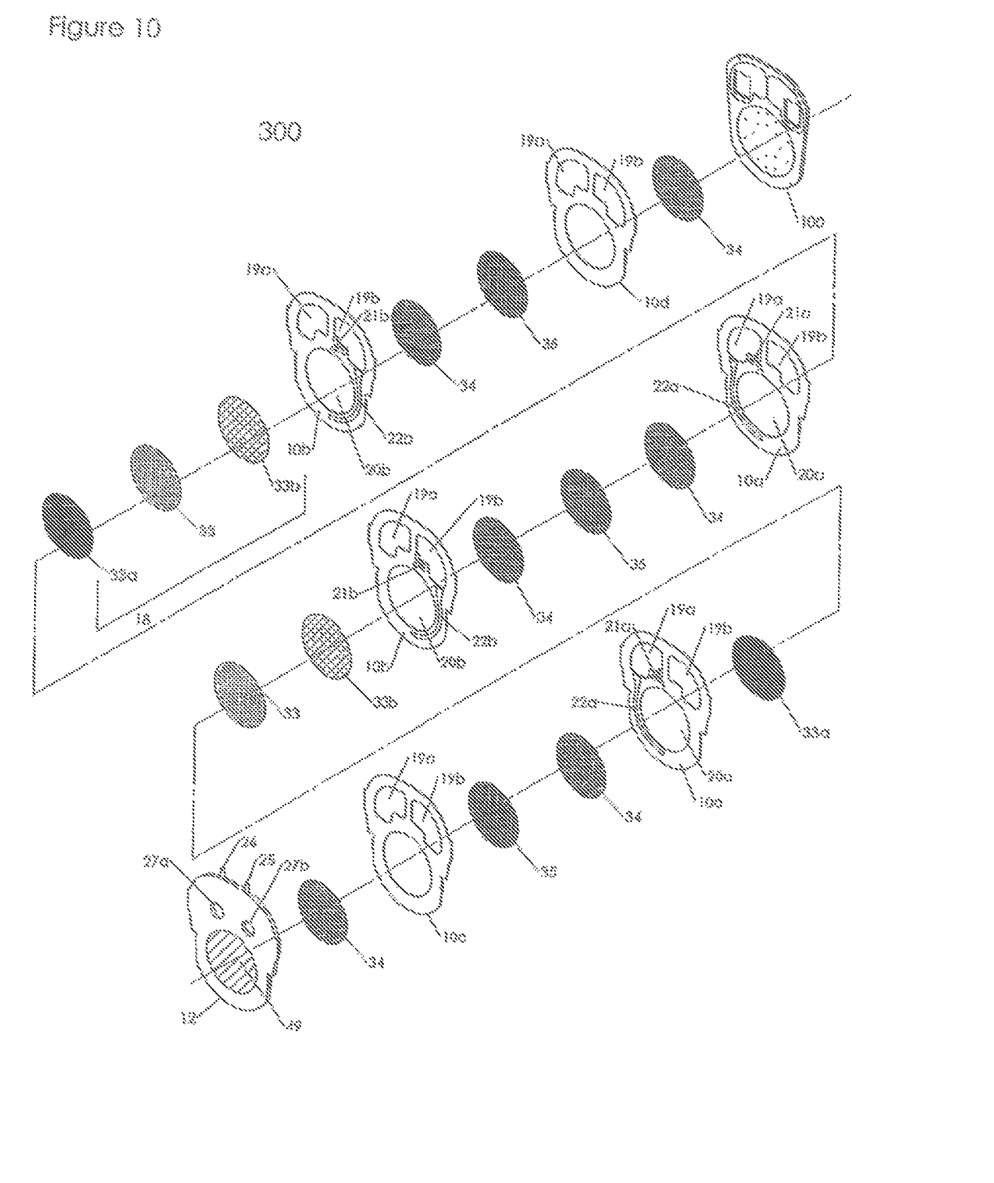
FIG. 10 is an exploded view of about half of a PEM electrolyser module in accordance with the present invention.

A PEM electrolyser module in accordance with an aspect of the present invention is shown generally at 300 in FIG. 10. FIG. 10 shows about half of a PEM electrolyser module with 4 cells for illustrative purposes only; the other half of the electrolyser module would be a mirror image (on either side of feature 12, which in this case represents the midpoint of the electrolyser module). In practice, typically greater numbers of cells and stacked parts would be incorporated. PEM electrolyser module 300 includes structural plates 10, end pressure plates 100, membrane-electrode assemblies (MEA's) 33, optionally electrode backing layers 33a and 33b, current carriers 34, bipolar plates 35 and optionally, one or more intermediate pressure plates 12. A typical MEA consists of a membrane and electrodes coated onto opposite faces of the membrane; a cathode coated onto one face of the membrane, and an anode coated onto the opposite face of the membrane. Thus, the membrane is in communication with each of the two electrodes for providing ionic conduction. In some embodiments, the electrode backing layers 33a and 33b also can be incorporated into the MEA 33. In the embodiment shown in FIG. 10, there are two main types of structural plates 10: cathode structural plates 10a and anode structural plates 10b. Additionally, special structural plates 10c and 10d can optionally be located adjacent to the optional intermediate pressure plate 12 and the end pressure plates 100, respectively, e.g., to help accommodate cooling conduits (e.g., cooling tubes or cooling coils). Suitable seals (e.g., o-ring gaskets, not shown) also are understood to be included.

PEM electrolyser module 300 thus comprises a plurality of electrolysis cells and an associated hydrogen degassing chamber 19a and an associated oxygen degassing chamber 19b. The PEM electrolysis cells 38 preferably are located at the bottom part of the electrolyser module 300, and the associated degassing chambers 19a and 19b preferably are located at the top part of the electrolyser module 300, surmounting the PEM electrolysis cells 38. The electrolysis cells comprise cathode and anode half cell chambers 38a and 38b defined by two adjacent structural plates, as well as a MEA 33, electrode backing layers 33a and 33b, and the current collectors 34. Bipolar plates 35 physically separate and provide electrical communication between adjacent cells. The optional intermediate pressure plates 12 optionally include suitably coated or plated electrically conducting areas or separate part 49, to facilitate electrical current flow through the portions of the intermediate pressure plates corresponding to the active cell area. The optional intermediate pressure plates 12 can be made of metal, plated metal, or coated metal, for example, but not limited to, one or more of steel, stainless steel, plated or coated steel, and plated or coated stainless steel. The term "metal" is to be understood to include metals and metal alloys.

As shown in FIG. 10, each cathode half cell chamber 20a is in direct fluid communication with the hydrogen degassing chamber 19a via a gas-liquid flow passage 21a, and a degassed liquid flow passage 22a. Similarly, each anode half cell chamber 20b is in direct fluid communication with the oxygen degassing chamber 19b via a gas-liquid flow passage 21b, and a degassed liquid flow passage 22b. Separated hydrogen gas exits through hydrogen gas discharge passage 25, which extends radially through to the hydrogen degassing chamber; separated oxygen gas exits through separated oxygen gas discharge passage 26, which extends radially through to the oxygen degassing chamber. Gas discharge passages 25 and 26 typically are contained in the optional intermediate pressure plates 12, or in one or both of the end pressure plates 100. In the former case, through holes 27a and 27b allow for gas communication between gas discharge passages 25 and 26 and degassing chambers 19a and 19b, respectively. Feed water is introduced to one or both of the hydrogen and oxygen degassing chambers 19a and 19b through feed water passages (not shown), which also typically are located in the optional intermediate pressure plates 12 or in one or both of the end pressure plates 100. Electrical current is supplied to the cell portion of electrolyser module 300 by, for example, a DC power supply, most commonly via positive and negative electrical connections to end pressure plates 100, and optionally with a non-current carrying electrical ground connection to optional intermediate pressure plate 12 at the midpoint of electrolyser module 300.

Figure 11A:
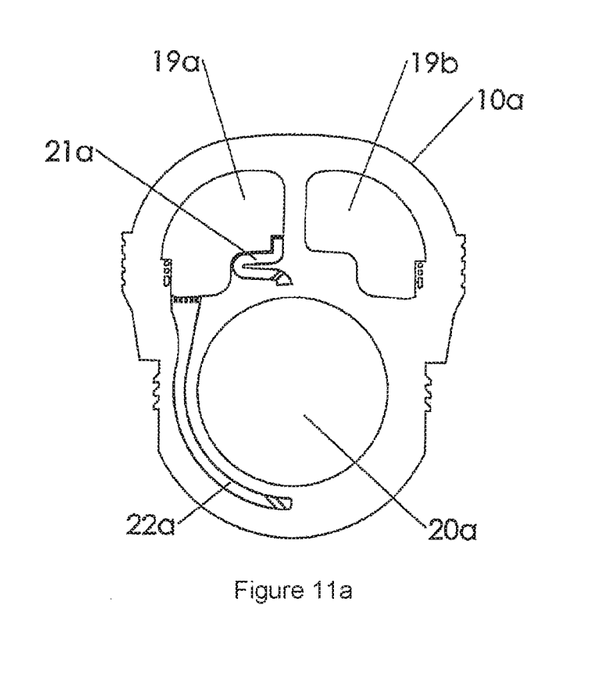
FIGS. 11a and 11b are front elevations showing respectively the front face of an embodiment of a cathode and an anode structural plate for an electrolyser module in accordance with the present invention.
Figure 11B:
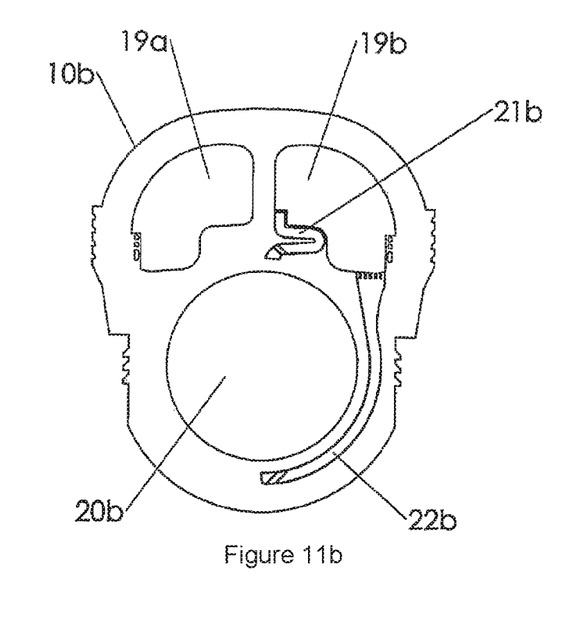

Cathode and anode structural plates for an electrolyser module in accordance with an aspect of the present invention are shown in FIGS. 11a and b respectively. FIG. 11a shows a preferred embodiment in which cathode structural plate 10a defines one half cell chamber opening 20a and two degassing chamber openings 19a and 19b; it is understood that each structural plate can define more than one of each type of opening. The structural plates define at least when in face to face juxtaposition, passages for fluid flow inside the electrolyser module. Cathode structural plate 10a defines one or more gas-liquid flow passages 21a, which provide direct fluid communication between the top part of the half cell chamber opening 20a and one of the degassing chamber openings 19a and 19b. Cathode structural plate 10a further defines one or more degassed liquid flow passages 22a, which provide direct fluid communication between the bottom part of the half cell chamber opening 20a and one of the degassing chamber openings 19a and 19b. Gas-liquid flow passages 21 become interior passages (slot-shaped through holes) near the top of half cell chamber opening 20; similarly, degassed liquid flow passages 22 become interior passages (slot-shaped through holes) near the bottom of half cell chamber opening 20. Cathode structural plate 10a also includes holding features (not shown) for locating and holding seals (e.g., o-ring gaskets), at least when in face-to-face juxtaposition with another structural plate, an end pressure plate, or an intermediate pressure plate. The structural plates are made of a suitable electrically insulating plastic or fiber-reinforced plastic. Examples of suitable plastics include polyoxymethylene (POM), polypropylene, polyphenylene oxide (PPO), polyphenylene sulphide (PPS) and the like, and in particular, polysulfone. Structural plates 10a and 10b shown in FIGS. 11a and b correspond respectively to cathode (hydrogen) structural plates 10a and anode structural plates 10b in FIGS. 9 and 10.

EXAMPLE 1

The behavior of an electrolyser module utilizing end pressure plates according to the present invention was modeled by finite element analysis (FEA). The general end pressure plate configuration was as shown in FIGS. 1-4. The load transfer plate and the backing plate were made of carbon steel. Modeling at 10 bar internal pressure showed that the load transfer plates remained flat, with displacements across a radial section of a load transfer plate varying from the center to the outside periphery varying by a maximum of only 0.008 inches.

It is contemplated that the electrochemical stack or electrolyser module of the present invention be used for large scale applications.

Although the embodiments above have focussed on electrolyser modules, the same principles can apply to an electrolyser cell stack. For example, an electrolyser stack comprises a plurality of structural plates each having a sidewall extending between opposite end faces with a half cell chamber opening, with at least two header flow passage openings and at least one footer flow passage opening extending through each structural plate between its opposite end faces. The structural plates are arranged in face to face juxtaposition between opposite end pressure plates. Each half cell chamber opening at least partially houses electrolytic half cell components comprising at least an electrode, a bipolar plate in electrical communication with the electrode, and a membrane communicating with the electrode for providing ionic conduction. The structural plates and half cell components therefore define an array of series connected electrolytic cells. The structural plates also define, at least when in face to face juxtaposition, passages for fluid flow inside the electrolyser stack. The end pressure plates comprise a load transfer plate for maintaining even pressure over the faces of the interior parts of the electrolyser stack, and a backing plate for supporting load transferred from the load transfer plate.

The foregoing description of the preferred embodiments and examples of the apparatus and process of the invention have been presented to illustrate the principles of the invention and not to limit the invention to the particular embodiments illustrated. It is intended that the scope of the invention be defined by all of the embodiments encompassed within the claims and/or their equivalents.

The invention claimed is:

1. An end pressure plate for at least one of an electrolyser stack and an electrolyser module comprising a load transfer plate for maintaining even pressure over the faces of a plurality of structural plates, and a backing plate for supporting load transferred from said load transfer plate;
wherein:
both faces of said load transfer plate are flat and one of said faces of said load transfer plate is in contact with an opposing face of the adjacent of said plurality of structural plates;
the opposite face of said load transfer plate is in contact with an opposing face of said backing plate; and
said opposing face of said backing plate includes a convex domed surface.

2. An end pressure plate as claimed in claim 1, wherein said end pressure plate includes at least one of metal, plated metal, and coated metal.

3. An electrolyser module comprising a plurality of structural plates each having a sidewall extending between opposite end faces with a half cell chamber opening and at least two degassing chamber openings extending through said structural plate between said opposite end faces;
said structural plates being arranged in face to face juxtaposition between opposite end pressure plates;
each said half cell chamber opening at least partially housing electrolytic half cell components comprising at least an electrode, a bipolar plate in electrical communication with said electrode, and a membrane communicating with said electrode for providing ionic conduction, said structural plates and half cell components defining an array of series connected electrolytic cells surmounted by at least one degassing chamber; and
said structural plates defining, at least when in face-to-face juxtaposition, passages for fluid flow inside said electrolyser module;
wherein:
said end pressure plates comprise a load transfer plate in contact with an adjacent of said structural plates for maintaining even pressure over the faces of said structural plates, and a backing plate in contact with said load transfer plate for supporting load transferred from said load transfer plate;
opposite faces of said load transfer plate are flat and one of said opposite faces of said load transfer plate is in contact with an opposing face of an adjacent of said plurality of structural plates;
the other of said opposite faces of said load transfer plate is in contact with an opposing face of said backing plate; and
said opposing face of said backing plate includes a domed surface.

4. The electrolyser module of claim 3 wherein said electrolyser module comprises a PEM water electrolyser module or an alkaline water electrolyser module.

5. An electrolyser stack comprising a plurality of structural plates each having a sidewall extending between opposite end faces with a half cell chamber opening, at least two header flow passage openings and at least one footer flow passage opening extending through said structural plate between said opposite end faces;
said structural plates being arranged in face to face juxtaposition between opposite end pressure plates;
each said half cell chamber opening at least partially housing electrolytic half cell components comprising at least an electrode, a bipolar plate in electrical communication with said electrode, and a membrane communicating with said electrode for providing ionic conduction, said structural plates and half cell components defining an array of series connected electrolytic cells; and
said structural plates defining, at least when in face-to-face juxtaposition, passages for fluid flow inside said electrolyser module;
wherein:
said end pressure plates comprise a load transfer plate in contact with an adjacent one of said structural plates for maintaining even pressure over the faces of said structural plates, and a backing plate in contact with said load transfer plate for supporting load transferred from said load transfer plate;
opposite faces of said load transfer plate are flat and one of said opposite faces of said load transfer plate is in contact with the opposing face of the adjacent of said plurality of structural plates;

the other of said opposite faces of said load transfer plate is in contact with an opposing face of said backing plate; and said opposing face of said backing plate includes a domed surface.

6. An end pressure plate for at least one of an electrolyser stack and an electrolyser module comprising a load transfer plate for maintaining even pressure over the faces of a plurality of structural plates, and a backing plate for supporting load transferred from said load transfer plate; wherein:

both faces of said load transfer plate are flat and one of said faces of said load transfer plate is in contact with an opposing face of the adjacent of said plurality of structural plates; and, the interior-facing face of said backing plate includes a convex domed surface that is in direct contact with the opposite face of said load transfer plate.

7. An electrolyser module comprising a plurality of structural plates each having a sidewall extending between opposite end faces with a half cell chamber opening and at least two degassing chamber openings extending through said structural plate between said opposite end faces;

said structural plates being arranged in face to face juxtaposition between opposite end pressure plates;

each said half cell chamber opening at least partially housing electrolytic half cell components comprising at least an electrode, a bipolar plate in electrical communication with said electrode, and a membrane communicating with said electrode for providing ionic conduction, said structural plates and half cell components defining an array of series connected electrolytic cells surmounted by at least one degassing chamber; and said structural plates defining, at least when in face-to-face juxtaposition, passages for fluid flow inside said electrolyser module;

wherein:

said end pressure plates comprise a load transfer plate in contact with an adjacent of said structural plates for maintaining even pressure over the faces of said structural plates, and a backing plate for supporting load transferred from said load transfer plate;

opposite faces of said load transfer plate are flat and one of said opposite faces of said load transfer plate is in contact with the opposing face of the adjacent of said plurality of structural plates; and, the interior-facing face of said backing plate includes a convex domed surface that is in direct contact with the other of said opposite faces of said load transfer plate.

8. An electrolyser stack comprising a plurality of structural plates each having a sidewall extending between opposite end faces with a half cell chamber opening, at least two header flow passage openings and at least one footer flow passage opening extending through said structural plate between said opposite end faces;

said structural plates being arranged in face to face juxtaposition between opposite end pressure plates;

each said half cell chamber opening at least partially housing electrolytic half cell components comprising at least an electrode, a bipolar plate in electrical communication with said electrode, and a membrane communicating with said electrode for providing ionic conduction, said structural plates and half cell components defining an array of series connected electrolytic cells; and said structural plates defining, at least when in face-to-face juxtaposition, passages for fluid flow inside said electrolyser module;

wherein:

said end pressure plates comprise a load transfer plate in contact with an adjacent one of said structural plates for maintaining even pressure over the faces of said structural plates, and a backing plate for supporting load transferred from said load transfer plate;

opposite faces of said load transfer plate are flat and one of said opposite faces of said load transfer plate is in contact with the opposing face of the adjacent of said plurality of structural plates; and, the interior-facing face of said backing plate includes a convex domed surface that is in direct contact with the other of said opposite end faces of said load transfer plate.

* * * * *